United States Patent
Staser

(10) Patent No.: US 7,246,465 B2
(45) Date of Patent: Jul. 24, 2007

(54) VEHICLE DOOR MODULE WITH SUPPORT PANEL HAVING INTEGRAL STAND-OFFS

(76) Inventor: Brian Hale Staser, 1727 Devonwood, Rochester Hills, MI (US) 48306

(*) Notice: Subject to any disclaimer, the term of this patent is extended or adjusted under 35 U.S.C. 154(b) by 0 days.

(21) Appl. No.: 11/259,827

(22) Filed: Oct. 27, 2005

(65) Prior Publication Data

US 2006/0037250 A1 Feb. 23, 2006

Related U.S. Application Data

(62) Division of application No. 10/303,362, filed on Nov. 25, 2002, now abandoned.

(60) Provisional application No. 60/333,556, filed on Nov. 27, 2001.

(51) Int. Cl.
*B60J 5/04* (2006.01)
(52) U.S. Cl. .................. 49/502; 49/352; 296/146.5
(58) Field of Classification Search ............. 49/502, 49/352, 349, 348; 296/146.5
See application file for complete search history.

(56) References Cited

U.S. PATENT DOCUMENTS

| | | | | |
|---|---|---|---|---|
| 5,535,553 A | * | 7/1996 | Staser et al. ................. | 49/502 |
| 5,573,297 A | * | 11/1996 | DeRees et al. .......... | 296/146.6 |
| 5,979,115 A | * | 11/1999 | Szerdahelyi et al. .......... | 49/502 |
| 6,161,337 A | * | 12/2000 | Morando ..................... | 49/352 |
| 6,192,632 B1 | * | 2/2001 | Medebach et al. ............ | 49/502 |
| 6,449,907 B2 | * | 9/2002 | Nishikawa et al. ........... | 49/502 |
| 6,460,904 B1 | * | 10/2002 | Stapf ....................... | 292/336.3 |
| 6,571,515 B1 | * | 6/2003 | Samways et al. ............. | 49/502 |
| 6,640,497 B2 | * | 11/2003 | Sakaguchi et al. ............ | 49/352 |

* cited by examiner

*Primary Examiner*—Gregory J. Strimbu
(74) *Attorney, Agent, or Firm*—Douglas D. Fekele

(57) ABSTRACT

An automotive door module has a plastic support panel and a plurality of door hardware components mounted thereon as a preassembled unit. The plastic support panel has forward and rearward pairs of upper and lower integrally molded stand-offs that secure forward and rearward rolled section guide rails of a cable operated window regulator without any intervening brackets. The plastic support panel also has an integrally molded handle bracket that rotatably supports a handle that operates a push-pull cable. The plastic support panel also includes an integrally molded bumper stop support that extends from the lower stand-off of one of the pairs of stand-offs through a hole in the guide rail secured to it and supports an annular bumper.

6 Claims, 6 Drawing Sheets

VEHICLE DOOR MODULE WITH SUPPORT PANEL HAVING INTEGRAL STAND-OFFS

RELATED APPLICATION

This application is a division of U.S. patent application Ser. No. 10/303,362, filed Nov. 25, 2002, now abandoned.

This patent application claims benefit of U.S. Provisional Patent application 60/333,556 filed Nov. 27, 2001.

FIELD OF THE INVENTION

This invention relates generally to a vehicle door module and more particularly to a vehicle door module that has a plastic mounting panel and various door hardware components mounted on the plastic mounting panel for assembly to a vehicle door as a preassembled unit.

BACKGROUND OF THE INVENTION

U.S. Pat. No. 5,535,553 granted to Brian H. Staser et al Jul. 16, 1996 discloses a vehicle door module comprising a plastic support panel and several hardware components mounted on the panel for assembly to a vehicle door as a preassembled unit. Components mounted on the plastic support panel include a sector gear type window regulator, and a handle assembly that operates a door latch by rods.

The vehicle door module disclosed in the Staser '553 patent is suitable for its intended purpose. However, the vehicle door module is not configured for a cable operated window regulator. The vehicle door module disclosed in the Staser '553 patent also lacks any provisions for mounting a handle that operates the door latch via a push-pull cable.

SUMMARY OF THE INVENTION

The vehicle door module of the invention has a plastic support panel and several hardware components mounted thereon including provisions for a cable operated window regulator. The cable type window regulator preferably includes guide rails that are rolled metal sections that are mounted on integrally molded stand-off of the plastic support panel without any intervening brackets.

The vehicle door module of the invention also preferably includes an integrally molded handle bracket for a handle that operates a door latch preferably with a push pull cable.

The door module of the invention also preferably includes wiring harness routing features and/or a bumper stop that works in conjunction with the cable operated window regulator.

BRIEF DESCRIPTION OF THE DRAWINGS

The present invention will now be described, by way of example, with reference to the accompanying drawings, in which.

DETAILED DESCRIPTION OF PREFERRED EMBODIMENT

Figure 1:
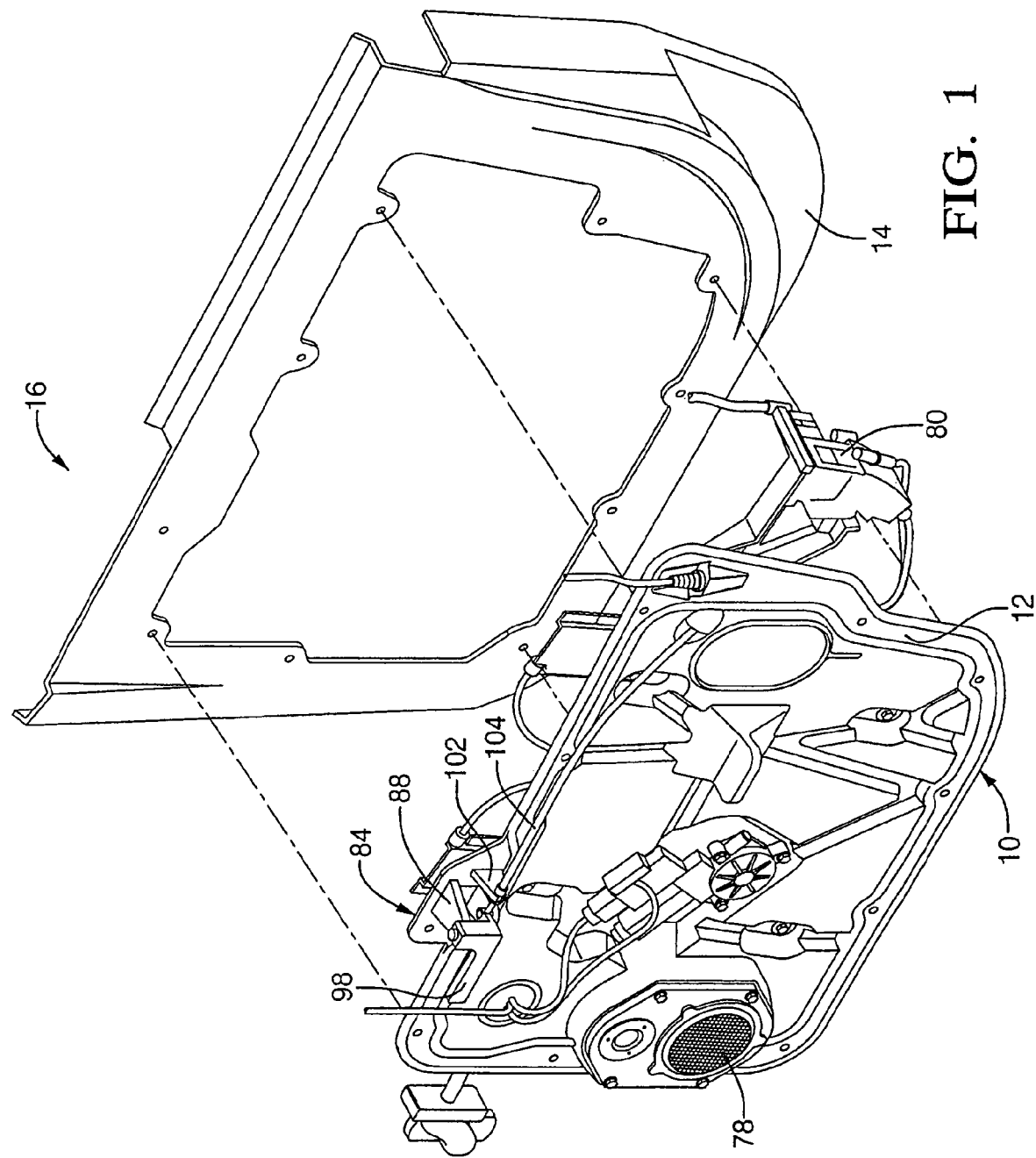
FIG. 1 is a perspective view of a vehicle door module of the invention exploded away from the automotive door panel to which the plastic support panel of the door module is attached.
Figure 2:
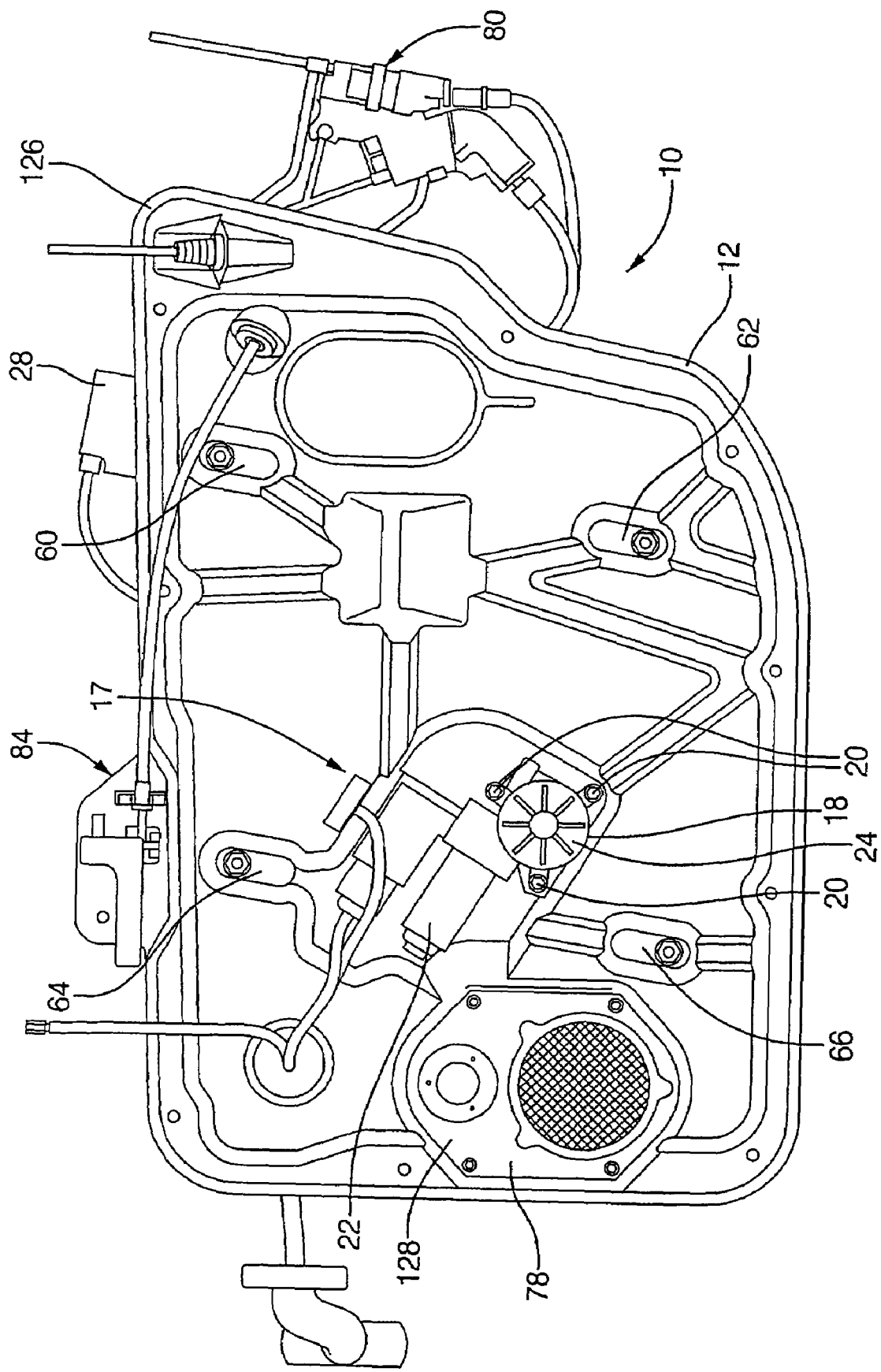
FIG. 2 is an inboard front view of the door module that is shown in FIG. 1.
Figure 3:
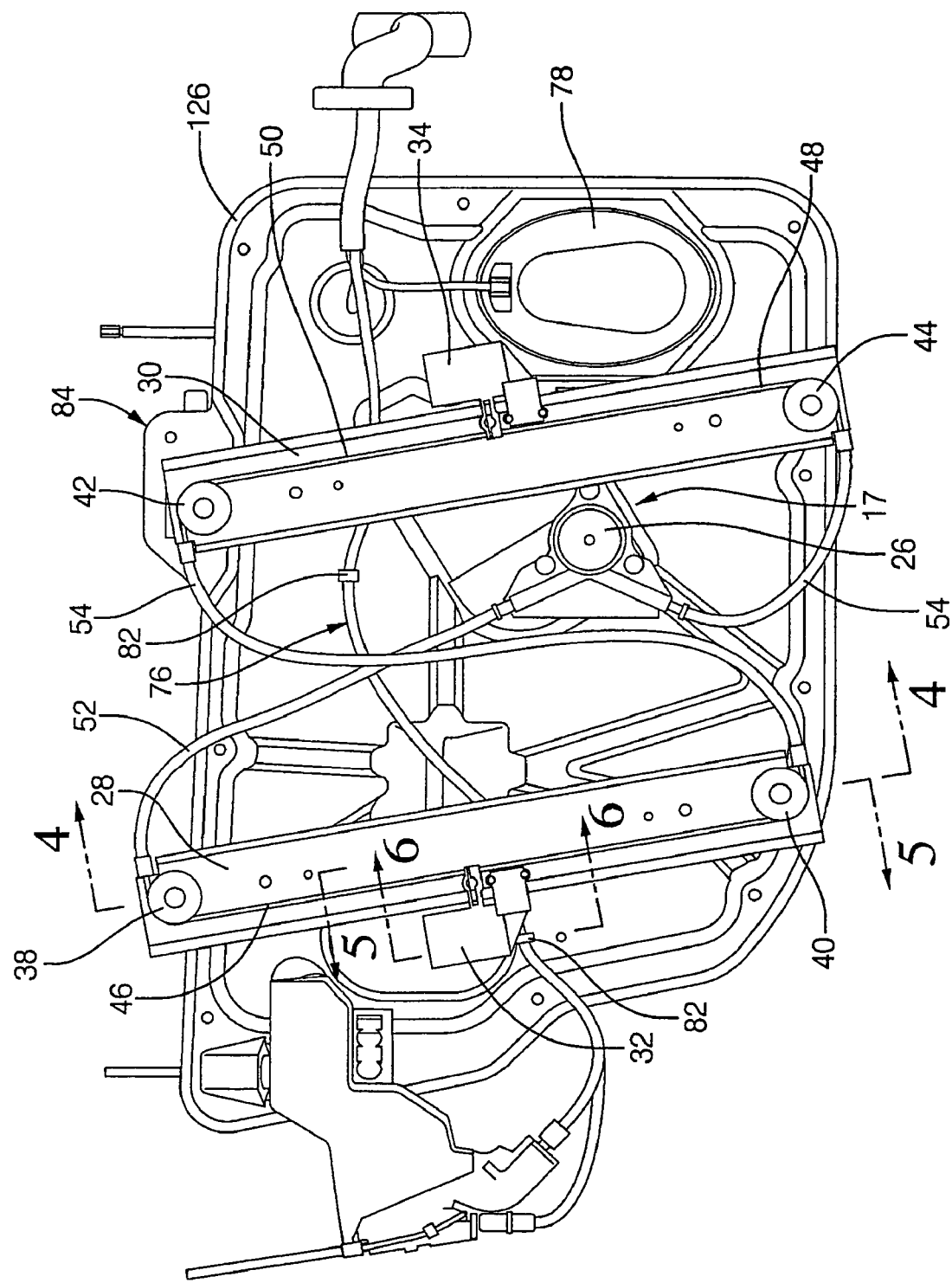
FIG. 3 is an outboard rear view of the door module that is shown in FIG. 1.

Referring now to FIGS. 1, 2 and 3 a vehicle door module 10 of the invention has a plurality of door hardware components mounted on a plastic support panel 12 of one-piece construction that is pre-assembled and attached to the sheet metal shell 14 of a vehicle door 16. Support panel 12 preferably has a foam core so that the plastic support panel 12 may have properties similar to that of the sheet metal shell.

The plastic support panel 12 supports a cable operated window regulator 17 that comprises several components including a drive unit 18 that is fastened to the support panel 12 by three bolts 20. The drive unit 18 includes an electric motor 22 that drives a gear set in a gear housing 24 located on the inboard side of the support panel 12 as shown in FIG. 2. The gear set in turn drives a cable drum in a cable drum housing 26 located on the outboard side of the support panel 12 as shown in FIG. 3. The gear set and the cable drum are not shown. However, these are well known components of a cable actuated window regulator that need not be disclosed in detail to understand the invention.

The gear housing 24 and the cable drum housing 26 are located on the inboard and outboard sides of the plastic support panel 12, respectively, and fastened together by bolts 20. Bolts 20 extend through holes through the support panel 12 that are outward of a central hole (not shown) that provides a passage for the output shaft of the gear set in gear housing 24 to extend through the support panel 12 and connect to and drive the cable drum in the cable drum housing 26 which is on the opposite side of the support panel 12.

The cable operated window regulator 17 includes two guide rails 28 and 30 that are fastened to the outboard side of the plastic support panel 12 as best shown in FIG. 3. Guide rails 28 and 30 slideably support and guide window clamps 32 and 34 that are attached to the bottom portion of a window pane (not shown) for raising and lowering the window pane. Window clamps 32 and 34 are raised and lowered in unison by a cable and pulley drive system comprising the cable drum in cable drum housing 26, upper and lower pulleys 38 and 40 on rear guide rail 28, upper and lower pulleys 42 and 44 on front guide rail 30 and three cables 46, 48 and 50.

Cable 46 is attached to rear window clamp 32 then wraps around upper pulley 38 and is then attached to the cable drum in cable drum housing 26. Cable 48 is attached to front window clamp 34, then wraps around lower pulley 44 and is then attached to the cable drum in cable drum housing 26. Cables 46 and 48 are attached to the cable drum so that one cable is wound onto the cable drum while the other cable is payed off the cable drum and vice versa.

Cable 50 is attached to rear window clamp 32, then wraps around pulley 40, then wraps around pulley 42 and is then attached to front window clamp 34.

Cables 46 and 48 preferably have sheaths 52 and 54 respectively between the cable drum housing 26 and their respective guide rails 28 and 30. The ends of the respective sheaths 52 and 54 are also preferably spring biased toward each other in a well known manner to keep cables 46 and 48 taunt. Cable 50 also preferably has a sheath 56 between guide rails 28 and 30.

Window regulator 17 operates in a well known manner to raise and lower a window pane (not shown) attached to window clamps 32 and 34. Briefly, rotation of the cable drum in cable drum housing 26 in a direction raises the window pane by pulling window rear clamp 32 up via cable 47 and front window clamp 34 up via interconnecting cable 50. Rotation of the cable drum in the opposite direction pulls front window clamp 34 down via cable 48 and rear window clamp 32 down via interconnecting cable 50.

Figure 4:
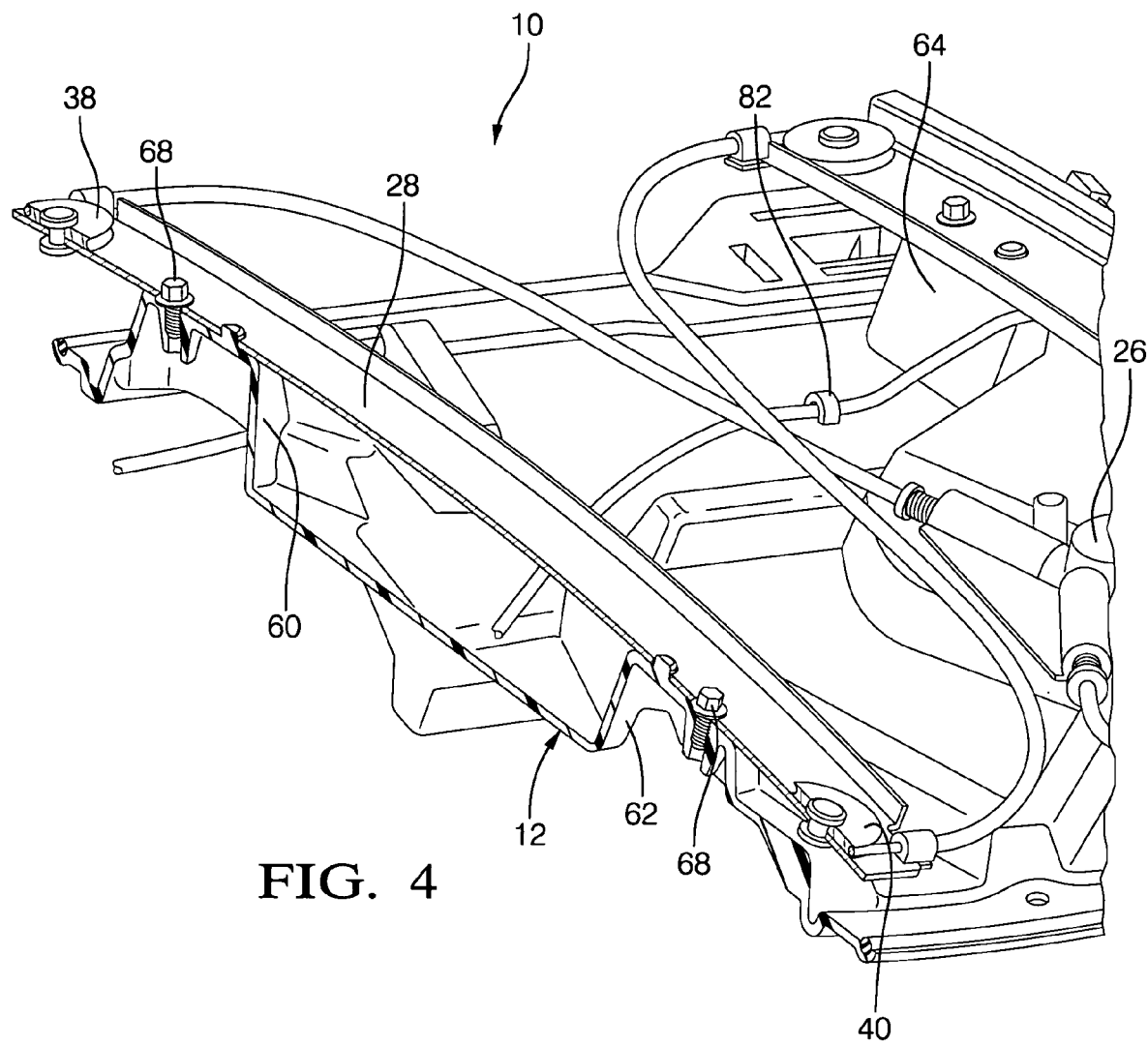
FIG. 4 is a sectional perspective view taken substantially along the line 4—4 of FIG. 3 looking in the direction of the arrows.

A feature of the invention is that the plastic support panel 12 has two pairs of integrated stand off 60 and 62 and 64 and 66 which are part of the one-piece plastic support panel 12 for supporting guide rails 28 and 30. These stand off appear as depressions in the inboard side of the support panel 12 as shown in FIGS. 1 and 2. The stand off are best shown in FIG. 4 which is a sectional perspective view taken substantially along the line 4—4 of FIG. 3 looking in the direction of the arrows. FIG. 4 shows one pair of integrated guide rail stand-off 60 and 62 for the rear guide rail 28 which appear as pedestals in the outboard side of the support panel 12. The guide rail 28 which is simply a rolled metal section is fastened to tops of the pedestal-like stand off 60 and 62 by two bolts 68 that are screwed into the tops of the respective stand off. Guide rail 30 is also a rolled metal section that is fastened to the tops of the second pair of pedestals-like stand-off 64 and 66 in the same manner.

Figure 5:
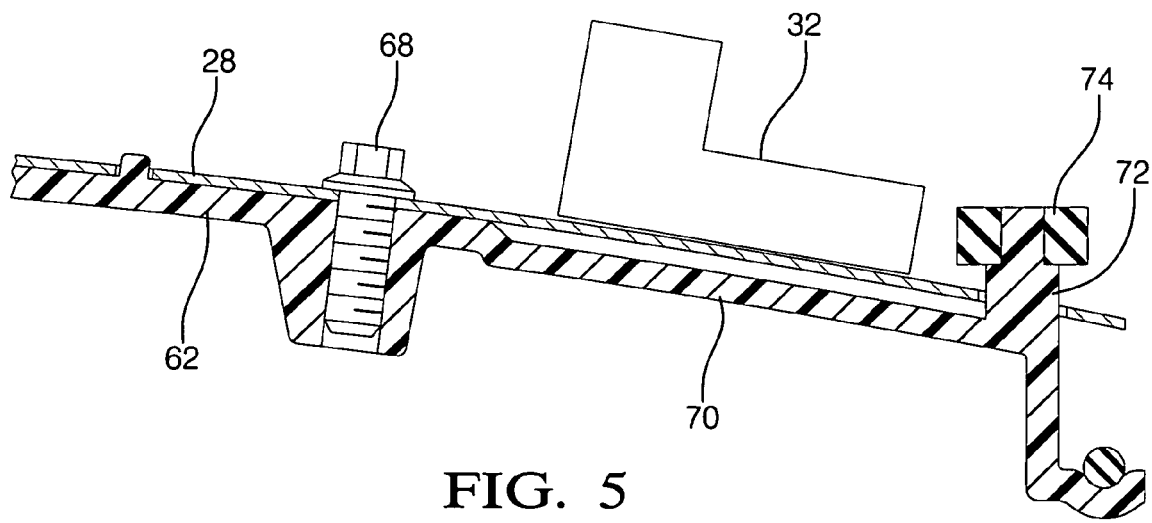
FIG. 5 is a sectional perspective view of a modification of FIG. 4 taken substantially along the line 5—5 of FIG. 3 looking in the direction of the arrows.

An optional feature that is easily incorporated into the plastic support panel 12 is shown in FIG. 5 which is a sectional perspective view of a modification taken substantially along the line 5—5 of FIG. 3 looking in the direction of the arrows. FIG. 5 shows a modified version of the lower stand off 62 which has been extended downwardly so that the length of the top 70 of the pedestal-like stand off 62 is increased in the vertical direction. An integral pin 72 is incorporated into the top 70 of stand-off 62 at the lower edge. Pin 72 extends through a hole in guide rail 28 and supports a rubber annulus 74 which acts as a down-stop bumper for the window clamp 32.

Another optional feature of the invention relates to wiring harnesses that are carried by the support panel 12 as part of the door module 10. For instance, and by way of example the door module 10 includes a wiring harness 76 (FIG. 3) for motor 22 as well as speaker 78 and door latch 80 that are carried by support panel 12.

Figure 6:
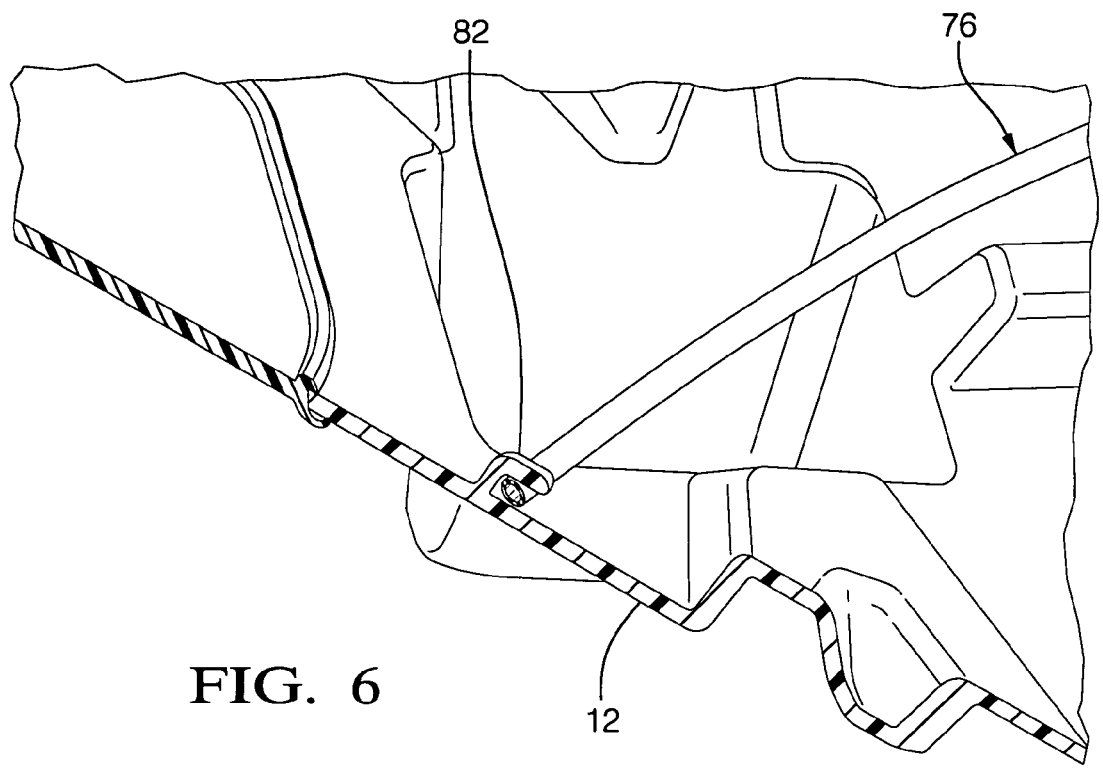
FIG. 6 is an enlarged sectional perspective taken substantially along the line 6—6 of FIG. 3 with the rear guide rail removed to show one of the integrated wire harness routing features.

FIG. 6 is an enlarged sectional perspective taken substantially along the line 6—6 of FIG. 3 below the rear guide rail 28 to show one of several integrated wire harness routing features 82 that are molded as part of the one piece support panel 12. Integrated wire harness routing features 82 replace and eliminate the need for the usual 6–8 rosebuds on a wiring harness that are typically used to attach a wiring harness to a support panel of a door module.

Another feature of the door module 10 is an integrated inside handle bracket that is molded as part of the plastic support panel 12 thus eliminating the need for the steel bracket that is typically used in an inside handle assembly.

Figure 7:
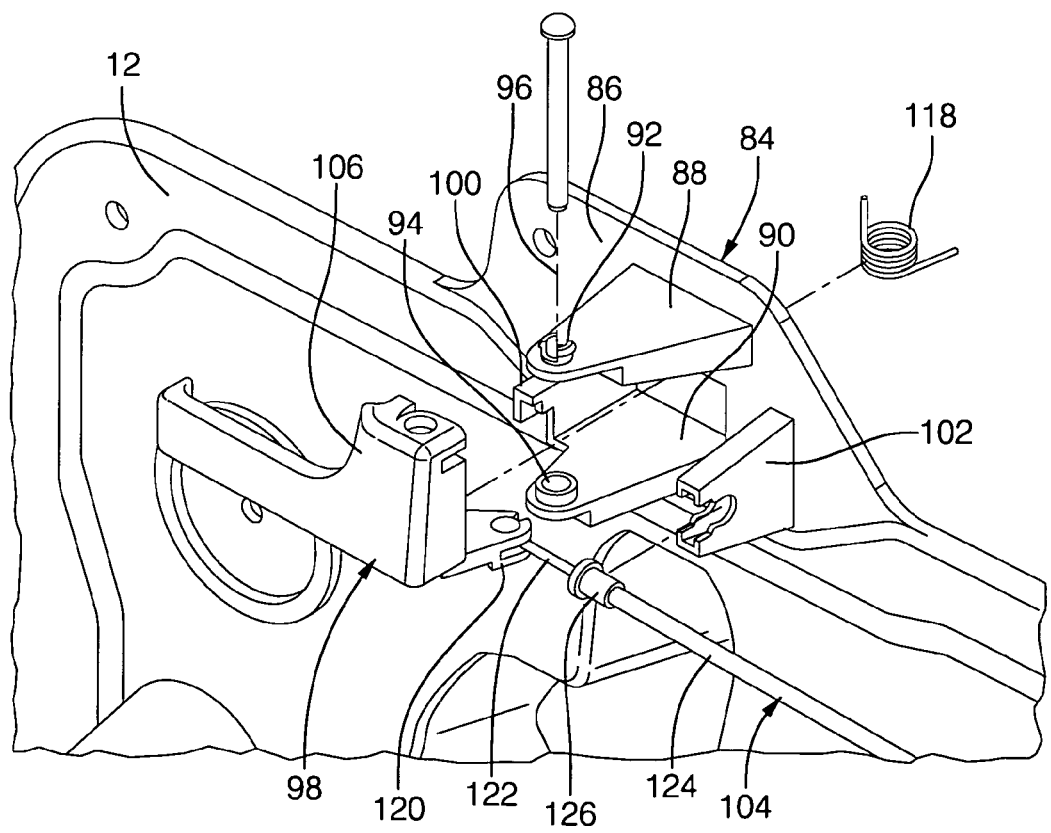
FIG. 7 is a perspective view of the door module showing the integrated inside handle bracket with the inside handle exploded away.
Figure 8:
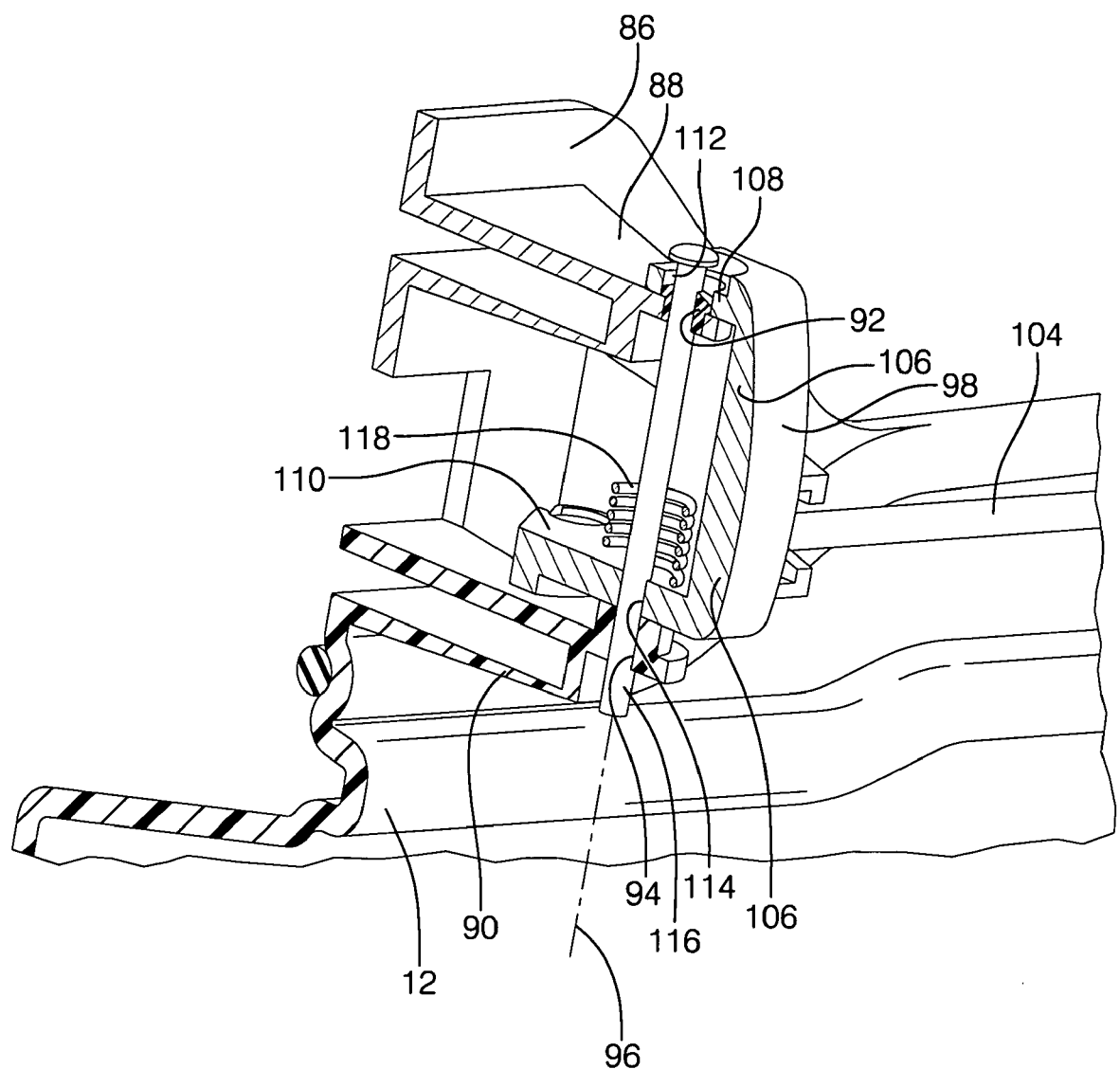
FIG. 8 is a cut-away of the door module showing the integrated inside handle bracket and the inside handle in section.

The integrated inside handle bracket is illustrated generally at 84 in FIGS. 7 and 8. FIG. 7 is a perspective view of the door module 10 showing the integrated inside handle bracket 84 with the inside handle exploded away while FIG. 8 is a cut-away of the door module 10 showing the integrated inside handle bracket and the inside handle in section.

The handle bracket 84 comprises a plate portion 86 of support panel 12 that has integrally molded generally horizontal legs 88 and 90 that are vertically spaced apart and extend inwardly in parallel fashion. Legs 88 and 90 have round holes 92 and 94 at their respective ends which are coaxial and define a pivot axis 96 for a handle 98.

The handle bracket 84 also preferably includes two generally integrally molded vertical legs 100 and 102. Leg 100 which is connected to the forward edge of leg 90 acts as a stop that limits the counterclockwise rotation of handle 98 when handle 96 is pivoted away from the rest position shown in FIG. 7 to actuate the door latch 80. Leg 102 which is spaced rearwardly of legs 88 and 90 provides an anchor for a push-pull cable 104 that operates the door latch 80 as explained below.

Handle 98 has a hinge portion 106 at one end that includes upper and lower legs 108 and 110 that include coaxial holes 112 and 114 as best shown in FIG. 8. Handle 98 is attached to handle bracket 84 by supporting legs 108 and 110 of handle. 98 on legs 88 and 90 of the handle bracket, aligning holes 112 and 114 on axis 96 and inserting a pivot pin 116 throughholes 112, 92, 114 and 94 as shown in FIG. 8.

Handle 98 prefereably includes a coil spring 118 that is located above leg 110 of handle 98. Coil spring 118 biases handle 98 clockwise to the rest position shown in FIG. 7. Handle 98 also includes an anchor 120 for push pull cable 104. Push pull cable 104 has a core 122 that is fastened to anchor 120 of handle 98 and a sheath 124 that is anchored to leg 102 of handle bracket 84 by a ferrule 126 at the end of sheath 124. When handle 98 is rotated counterclockwise as shown in FIG. 7, core 122 translates forward, that is, moves to the left with respect to sheath 124. Sheath 124 is anchored to latch 70 at the other end and core 122 is attached to an unlatching lever of latch 70 at the other end so that handle 98 unlatches the door in well known manner when handle 98 is rotated counterclockwise.

The plastic panel may also include a peripheral seal 126 and an integrated speaker bracket 128.

The plastic support panel of the invention reduces costs significantly by eliminating several tools and components; improves manufacturability by reducing assembly complexity; and improves quality by improving tolerance stack-ups.

Obviously, many modifications and variations of the present invention in light of the above teachings may be made. It is, therefore, to be understood that, within the scope of the appended claims, the invention may be practiced otherwise than as specifically described.

The invention claimed is:

1. An automotive door module for attachment to a door panel and for use with a window and a window clamp attached to the window, said door module comprising:

a plastic support panel comprising an integrally molded upper stand-off, an integrally molded lower stand-off, and an integrally molded bumper stop support extending from the lower stand-off, wherein the plastic support panel, the lower stand-off and the bumper stop support are a single, integral and continous element; and a guide rail for a guiding the window clamp and window between open and closed positions, said guide rail being fastened to the integrally molded upper stand-off and the integrally molded lower stand-off, said guide rail having an opening such that the integrally molded bumper stop support extends through the opening; and a bumper stop directly carried by the integrally molded bumper stop support and adapted to engage the window clamp in the closed postion.

2. The automotive door module of claim 1 wherein the guide rail comprises a rolled section and is secured to the integrally molded upper and lower stand-offs without intervening brackets.

3. The automotive door module of claim 1 wherein the guide rail is a first guide rail, and the integrally molded upper and lower stand-offs constitute a first pair of integrally molded upper and lower stand-offs, said panel further comprising a second pair of integrally molded upper and lower stand-offs, and said automotive door module further comprising a second guide rail fastened to the second pair of integrally molded upper and lower stand-offs.

4. The automotive door module of claim 1 wherein the plastic support panel comprises an integrally molded handle bracket for rotatably supporting a handle.

5. The automotive door module of claim 1 wherein the plastic support panel has integrated wire harness routing features.

6. The automotive door module of claim 1 wherein the bumper stop is annular.

* * * * *